United States Patent [19]

Balser

[11] 4,143,547
[45] Mar. 13, 1979

[54] METHOD AND APPARATUS FOR REMOTE MEASUREMENT OF VARIATION IN WIND VELOCITY

[75] Inventor: Martin Balser, Los Angeles County, Calif.

[73] Assignee: Xonics, Inc., Van Nuys, Calif.

[21] Appl. No.: 903,481

[22] Filed: May 8, 1978

[51] Int. Cl.² ............................................. G01S 9/66
[52] U.S. Cl. ................................ 73/170 R; 73/194 A
[58] Field of Search ................ 73/194 A, 189, 170 R; 343/5 W

[56] References Cited

U.S. PATENT DOCUMENTS

| 3,340,528 | 9/1967 | Atlas | 343/5 W X |
| 3,491,358 | 1/1970 | Hicks | 343/5 W X |
| 3,671,927 | 6/1972 | Proudian et al. | 73/170 R |
| 3,889,533 | 6/1975 | Balser | 73/194 A X |

Primary Examiner—Charles A. Ruehl
Attorney, Agent, or Firm—Harris, Kern, Wallen & Tinsley

[57] ABSTRACT

An acoustic echo system transmitter and receivers for measuring signal scattering at a zone resulting from wind movement, with the receiver doppler outputs averaged to provide spectra of wind velocity. Method and apparatus for calculating the second moment of the spectra which corresponds to gust velocities in the zone.

16 Claims, 4 Drawing Figures

METHOD AND APPARATUS FOR REMOTE MEASUREMENT OF VARIATION IN WIND VELOCITY

BACKGROUND OF THE INVENTION

This invention relates to the measurement of variations in the velocity of wind at a specific location, such as the measurement of the velocity of gusts which may have a duration of a few seconds.

Conventional wind measurements are carried out by instruments, such as the cup anemometer, that respond in a time which is comparable to or shorter than the times of interest for variations or gusts in the wind. These variations can be resolved in time and measured directly. However, instruments of this type have to be physically mounted to the ground or a support structure and hence there are severe limitations on where the measurement can be made.

Another type of instrument provides for the measurement of average winds from a remote location. One such instrument is the doppler acoustic echo system shown in U.S. Pat. No. 3,889,533. A signal is transmitted from the ground to the location at which the measurement is to be made. This signal is scattered, and the scattered signal along two or more paths is picked up by antennas on the ground, giving a measure of components of the wind at various altitudes, up to several hundred meters for a typical instrument.

However, interfering noise in the acoustic echo system generally prevents a confident measurement from being made in a time interval of a few seconds. To compensate for the weak scattered signal relative to the noise, the received signals are averaged over a longer interval, typically 1 or 2 minutes or more, so that the noise can be smoothed and the scattered signal can be observed to provide a measure of the average wind velocity. The interval required for averaging is longer than some intervals of interest in measuring wind variability in the nature of gusts, which may have a duration of only a few seconds.

Accordingly, it is an object of the present invention to provide method and apparatus for measurement from a remote location of variations in velocity of wind, which variations may occur in a few seconds. Other objects, advantages, features and results will more fully appear in the course of the following description.

SUMMARY OF THE INVENTION

The present invention is an advance over that of the aforesaid U.S. Pat. No. 3,889,533. In this earlier system, a signal is transmitted toward the zone of interest. Inhomogeneities in the air at the zone produces scattering of the signal, and two or more receivers are utilized for receiving such scattered signals. Each receiver provides an output signal having a doppler frequency shift proportional to a component of the wind, and the output signal is averaged over a period of time, typically several minutes. The result of the averaging process is a spectrum which is the superposition of all the contributions received during the averaging interval, with each contribution weighted by the strength of the return at that time. This weighting is different in detail from the direct wind measurement, in which all samples are in general equally weighted. The statistical moment of the spectrum may however be the same as for the direct type measurement. In particular, if the instantaneous strength of the return and its fluctuations during the measurement interval are independent of the wind speed, then the spectrum obtained is essentially that of the wind itself and the received power may be considered to be constant. Then the second central moment of the receiver output spectrum corresponds to the variation in wind velocity in the interval of measurement.

FIGS. 1 and 2 are two spectra obtained by a doppler acoustic echo system of the type shown in the aforesaid U.S. Pat. No. 3,889,533 measuring wind velocity at an altitude of about 100 meters, with a measuring interval of about 1 minute. The horizontal line represents wind velocity in meters per second and the vertical line represents strength of the received signal. FIG. 1 illustrates a case in which the wind was strong but relatively steady. The mean wind speed is 16 meters per second, while the standard deviation of the spectrum is only 1.5 meters per second. FIG. 2 illustrates a case when the mean wind was lower, but noticeably gusty, even on the ground. The mean wind speed is 7.5 meters per second, while the standard deviation is 3.5 meters per second. As used in this application and in statistical measurements, the first moment of a distribution curve is the average or mean value, the second moment is the standard deviation from the mean and is a measure of the width of the curve, and the third moment represents the skewness and is a measure of the asymmetry of the curve.

In the present invention, the measurement of the second moment or standard deviation of the spectrum provides a measure of the wind variability corresponding to fluctuations over time intervals shorter than the integration interval, that is, the system of the invention provides a measure of the intensity of gusts of wind which may last from a few up to many tens of seconds utilizing a measurement in an averaging interval of one or a few minutes. The same techniques can be extended in an obvious manner to the measurement of the higher-order statistical moments for the purpose of estimating skewness, etc.

DESCRIPTION OF THE PREFERRED EMBODIMENTS

Figure 1:
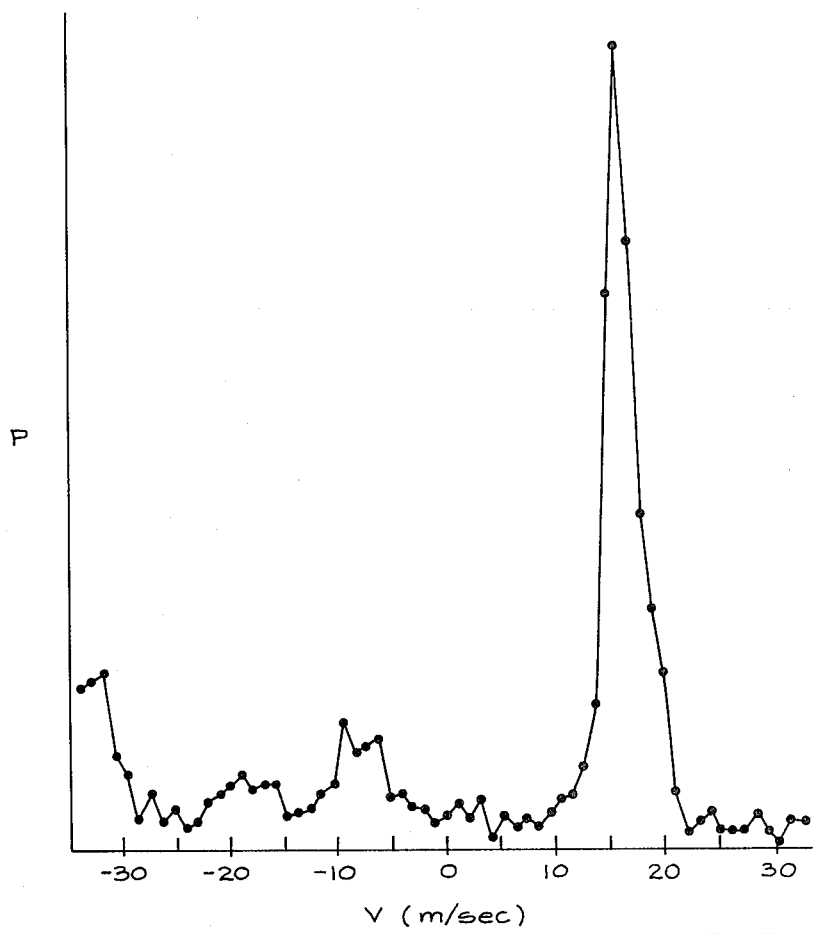
FIGS. 1 and 2 are spectra of actual measurements of wind velocity produced by a doppler acoustic echo system.
Figure 2:
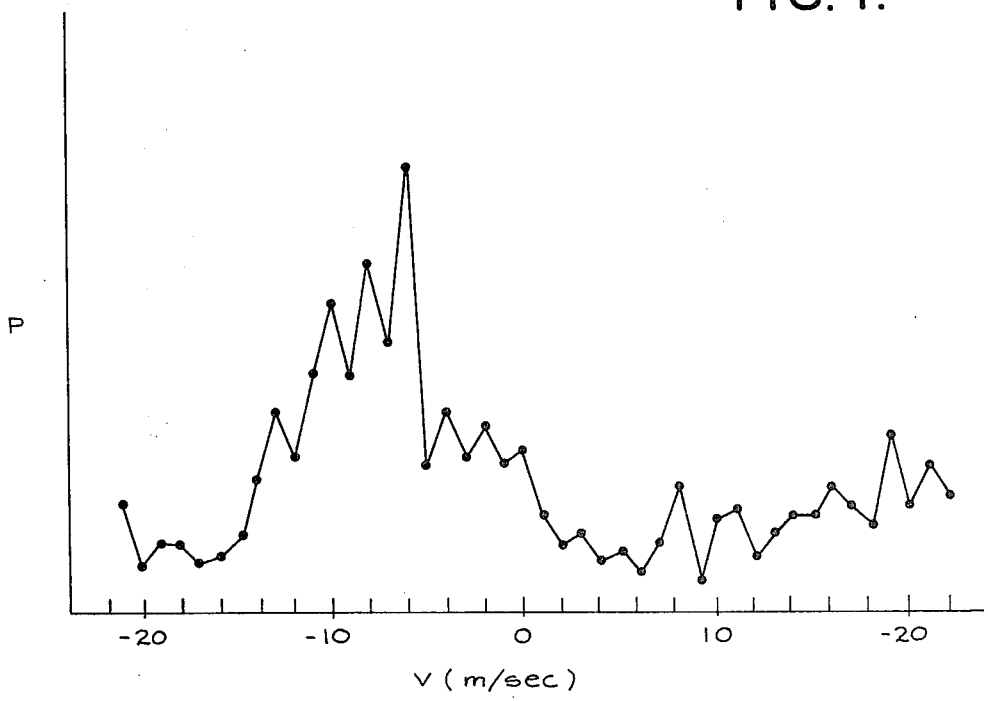
Figures 3, 4:
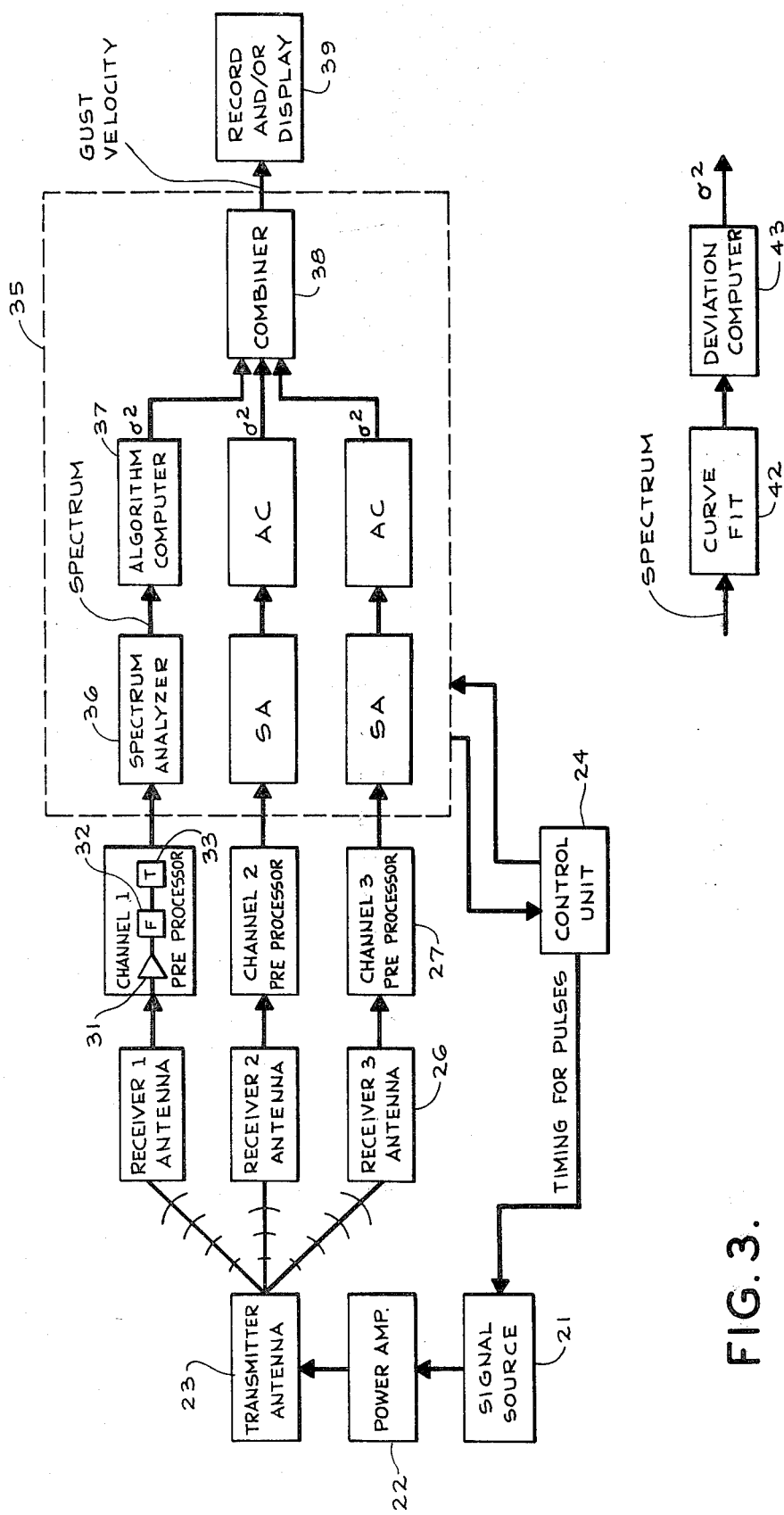
FIG. 3 is a block diagram illustrating transmitter, receivers and signal processing units incorporating the presently preferred embodiment of the invention.
FIG. 4 is a block diagram of an alternative embodiment for a portion of the system of FIG. 3.

Referring to FIG. 3, the transmitter includes a signal source 21, a power amplifier 22, and an antenna or transducer 23. The signal from the source is amplified and transmitted toward the zone of interest, typically vertically upward from the antenna location on the ground. For CW operation, the signal source is essentially an oscillator, while for pulsed operation, a pulsed modulator is incorporated with timing control by a control unit 24 which also provides timing for the signal processing cycle.

The receiving system includes one or more antennae or transducers 26 and pre-processors 27. Each pre-processor may include an amplifier 31, a filter 32 and a frequency translator 33. Typically each receiver antenna is positioned on the ground and aimed at the zone of interest, with the receiver antennas spaced from each other. One receiver antenna may be colocated with the transmitter antenna if desired.

The receiver output signals are connected to a signal processor 35, which in the embodiment illustrated provides a spectrum analyzer 36 and an algorithm computer 37 for each receiver channel. The output of the algorithm computers may be recorded and/or displayed directly to give estimates of variability of the individual components, and may also be used as inputs to a combiner unit 38 which provides an output to a record and/or display unit 39 to give an estimate of the variability of the vector wind.

The doppler acoustic echo system provides a measurement of wind velocity from a remote location by analyzing rather weak scattered signals. The wind velocity is sensed through the doppler shift imposed on the scattered signal and is further weighted by the instantaneous strength of the scattering. Typically the wind output measurement is made by averaging data accumulated over intervals of 1 to 5 minutes. The wind velocity measurements made by this process are valid despite the indirect effects such as variations in scattering strength, since the indirect effects are found to be independent of the wind speed over the conditions encountered at a given measurement zone during a measurement interval. Hence, the variation of the measured quantity, that is the doppler spectrum, provides a measure of wind velocity.

Hence, in the present invention, the measure of the second central moment of the spectrum provides a measure of the variation in wind velocity. Given the wind as a function of time v(t), the second moment $\sigma^2$ for an interval T may be calculated as $$\sigma^2 = \frac{1}{T} \int_0^T (v(t) - \bar{v})^2 \, dt \quad (1)$$

where $\bar{v}$ is the mean value, generally itself estimated as $$\bar{v} = \frac{1}{T} \int_0^T v(t) \, dt \quad (2)$$

With the described technique, it is assumed that v(t) is not available. The output of the spectrum analyzer 36 is an averaged output rather than a plurality of individual measurements and therefore the second moment may be calculated as $$\sigma^2 = \frac{\int (v - \bar{v})^2 P(v) \, dv}{\int P(v) \, dv} \quad (3)$$

where $\bar{v}$ is estimated as $$\bar{v} = \frac{\int v P(v) \, dv}{\int P(v) \, dv} \quad (4)$$

and P(v) is the measured velocity (i.e., doppler-frequency) spectrum.

In the embodiment of FIG. 3, the expression of equation (3) is computed in the algorithm computer 37. If the receiver signals are processed by analog means and a continuous spectrum is derived therefrom, equations (3) and (4) may be used directly as shown. If the receiver signals are processed in a digital manner so that the spectrum consists of values at a discrete set of frequencies or velocities, the discrete equivalents of equations (3) and (4) will be used in the computation.

In an alternative process apparatus and method (FIG. 4), a curve-fit unit 42 and a deviation computing unit 43 may be substituted for the algorithm computer 37, and these units may be either analog or digital in nature. The curve-fit unit 42 operates in the conventional manner to substantially fit a curve to the spectrum from the spectrum analyzer 36. Then the deviation computing unit 43 computes the standard deviation or second moment of the fitted curve to provide the desired output. This embodiment can be used to avoid contamination of the computed second moment by noise in the wings of the spectrum.

While the invention has been illustrated herein as used with a doppler acoustic echo system, it will be understood that it is equally applicable to other wind measuring systems which provide a spectrum of wind velocities as an output.

I claim:

1. In a system for measuring variations in velocity of wind at a specific location, the combination of:
    an acoustic echo system transmitter for directing a beam of acoustic energy toward a zone spaced from said transmitter;
    a plurality of receivers for said transmitter and spaced from each other, with each receiver directed toward said zone for receiving acoustic energy of said transmitter scattered in said zone and providing a receiver output signal having a doppler frequency component;
    a spectrum analyzer for each receiver output and providing as an output a spectrum of the receiver output signal averaged over a first time period; and
    first means for calculating the second moment of each of said spectra for generating an output signal for each spectrum as a measure of the variation in each component of the velocity of the wind at said zone in a second time period substantially shorter than said first time period.

2. A system as defined in claim 1 including second means for combining the outputs of each of said first means and providing an output signal as a measure of the variability of the vector velocity of the wind at said zone in said second time period.

3. A system as defined in claim 1 wherein each of said spectrum analyzers provides a digital output, and each of said first means performs a digital calculation.

4. A system as defined in claim 1 wherein each of said spectrum analyzers provides an analog output, and each of said first means performs an analog calculation.

5. A system as defined in claim 1 wherein each of said first means includes means for calculating the algorithm $$\sigma^2 = \frac{\int (v - \bar{v})^2 P(v) \, dv}{\int P(v) \, dv}$$

where $\sigma^2$ is the second moment, v is the wind velocity associated with the measured doppler shift in the spectrum analyzer output, $$\bar{v} = \frac{\int v P(v) \, dv}{\int P(v) \, dv}$$

and P(v) is the measured velocity (i.e., doppler-frequency) spectrum.

6. A system as defined in claim 1 wherein each of said first means includes a curve-fitting unit for providing a distribution curve substantially matching the spectrum, and a deviation-computing unit having the distribution curve as an input for computing the standard deviation of said curve with said deviation being said second moment.

7. A method of measuring the variation in velocity of wind at a specific location, including steps of:

transmitting a signal toward the zone at which wind movement is to be measured and detecting scattering of the signal in the zone resulting from wind movement in the zone along each of a plurality of paths;

for each path, producing a doppler frequency component of the scattered signal;

for each path, producing a spectrum of the doppler frequency components averaged over a first period of time; and for each path, calculating the second moment of the spectrum to produce an output measuring the variations of each component of the velocity of the wind along the path at the zone in a second time period substantially shorter than said first time period.

8. The method of claim 7 including the step of combining the second moments to produce a single output measuring the variations of the vector velocity of the wind at said zone in said second time.

9. The method of claim 7 wherein said calculating step includes generating a distribution curve substantially matching the spectrum, and computing the standard deviation of said distribution curve with the deviation being the second moment.

10. The method of claim 7 wherein said calculating step includes calculating the algorithm $$\sigma^2 = \frac{\int (v - \bar{v})^2 P(v) \, dv}{\int P(v) \, dv}$$

where $\sigma^2$ is the second moment, v is the wind velocity associated with the measured doppler shift in the spectrum analyzer output, $$\bar{v} = \frac{\int v P(v) \, dv}{\int P(v) \, dv}$$

and P(v) is the measured velocity (i.e., doppler-frequency) spectrum.

11. In a system for measuring variations in velocity of wind at a specific location, the combination of:

transmitter means for directing a signal toward a zone spaced from said transmitter;

a plurality of receivers for said transmitter means and spaced from each other, with each receiver directed toward said zone for receiving portions of the transmitter signal scattered in said zone and providing a receiver output having a doppler frequency component;

a spectrum analyzer for each receiver output and providing as an output a spectrum of the receiver output signal averaged over a first time period; and first means for calculating the second moment of each of said spectra for generating an output signal for each spectrum as a measure of the variations in each component of the velocity of the wind at said zone in a second time period substantially shorter than said first time period.

12. A system as defined in claim 11 including second means for combining the outputs of each of said first means and providing an output signal as a measure of the variability of the vector velocity of the wind at said zone in said second time period.

13. A system as defined in claim 11 wherein each of said spectrum analyzers provides a digital output, and each of said first means performs a digital calculation.

14. A system as defined in claim 11 wherein each of said spectrum analyzers provides an analog output, and each of said first means performs an analog calculation.

15. A system as defined in claim 11 wherein each of said first means includes means for calculating the algorithm $$\sigma^2 = \frac{\int (v - \bar{v})^2 P(v) \, dv}{\int P(v) \, dv}$$

where $\sigma^2$ is the second moment, v is the wind velocity associated with the measured doppler shift in the spectrum analyzer output, $$\bar{v} = \frac{\int v P(v) \, dv}{\int P(v) \, dv}$$

and P(v) is the measured velocity (i.e., doppler-frequency) spectrum.

16. A system as defined in claim 11 wherein each of said first means includes a curve-fitting unit for providing a distribution curve substantially matching the spectrum, and a deviation-computing unit having the distribution curve as an input for computing the standard deviation of said curve with said deviation being said second moment.

* * * * *